(12) United States Patent
Schaffer

(10) Patent No.: US 6,279,690 B1
(45) Date of Patent: Aug. 28, 2001

(54) ELECTRO-MECHANICAL BRAKE SYSTEM FOR A VEHICLE

(75) Inventor: Wolfram Schaffer, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/554,455

(22) PCT Filed: Jul. 11, 1998

(86) PCT No.: PCT/DE98/01935

§ 371 Date: Aug. 25, 2000

§ 102(e) Date: Aug. 25, 2000

(87) PCT Pub. No.: WO99/25986

PCT Pub. Date: May 27, 1999

(30) Foreign Application Priority Data

Nov. 13, 1997 (DE) .............................................. 197 50 273

(51) Int. Cl.[7] .................................................. F16D 55/02
(52) U.S. Cl. .......................................... 188/71.9; 188/199
(58) Field of Search ................................ 188/71.9, 71.7, 188/72.8, 199, 196 P, 196 D, 196 B, 196 BA; 192/12 R, 16

(56) References Cited

U.S. PATENT DOCUMENTS

| | | | |
|---|---|---|---|
| 3,467,228 | * 9/1969 | Knights | 188/72.8 |
| 3,895,695 | * 7/1975 | Hunter | 188/170 |
| 4,234,064 | * 11/1980 | Tregoning | 188/196 BA |
| 4,546,298 | * 10/1985 | Wickham et al. | 318/372 |
| 4,615,417 | * 10/1986 | Schneider et al. | 188/72.8 |
| 4,804,073 | * 2/1989 | Taig et al. | 188/72.1 |
| 4,836,338 | * 6/1989 | Taig | 188/72.1 |
| 4,850,457 | * 7/1989 | Taig | 188/72.1 |
| 4,966,255 | * 10/1990 | Fossum | 188/71.8 |
| 5,123,505 | * 6/1992 | Antony | 188/71.9 |
| 5,868,225 | * 2/1999 | Hulliger | 188/72.4 |
| 5,949,168 | * 9/1999 | Dieckmann et al. | 310/75 R |
| 5,971,110 | * 10/1999 | Martin | 188/72.1 |
| 6,098,762 | * 8/2000 | Reimann et al. | 188/72.5 |
| 6,145,633 | * 11/2000 | Niederstadt | 188/71.8 |
| 6,145,634 | * 11/2000 | Holding | 188/72.8 |
| 6,189,661 | * 2/2001 | Schaffer | 188/157 |

* cited by examiner

*Primary Examiner*—Robert J. Oberleitner
*Assistant Examiner*—Benjamin A. Pezzlo
(74) *Attorney, Agent, or Firm*—Ronald E. Greigg; Edwin E. Greigg

(57) ABSTRACT

An electromechanical brake for motor vehicles such as passenger vehicles, has a member that can be electromotively moved in two directions, longitudinally speaking, in order to press at least one brake lining against a friction element in an application stroke and in order to release the brake lining in a restoring stroke. In addition, a clutch is provided which can be actuated by the longitudinally movable member and which effectively disengages the longitudinally movable member from the electric drive motor when a permissible restoring stroke is exceeded. This prevents a mechanical failure or damage to the brake in the event of a malfunction of this kind.

4 Claims, 2 Drawing Sheets

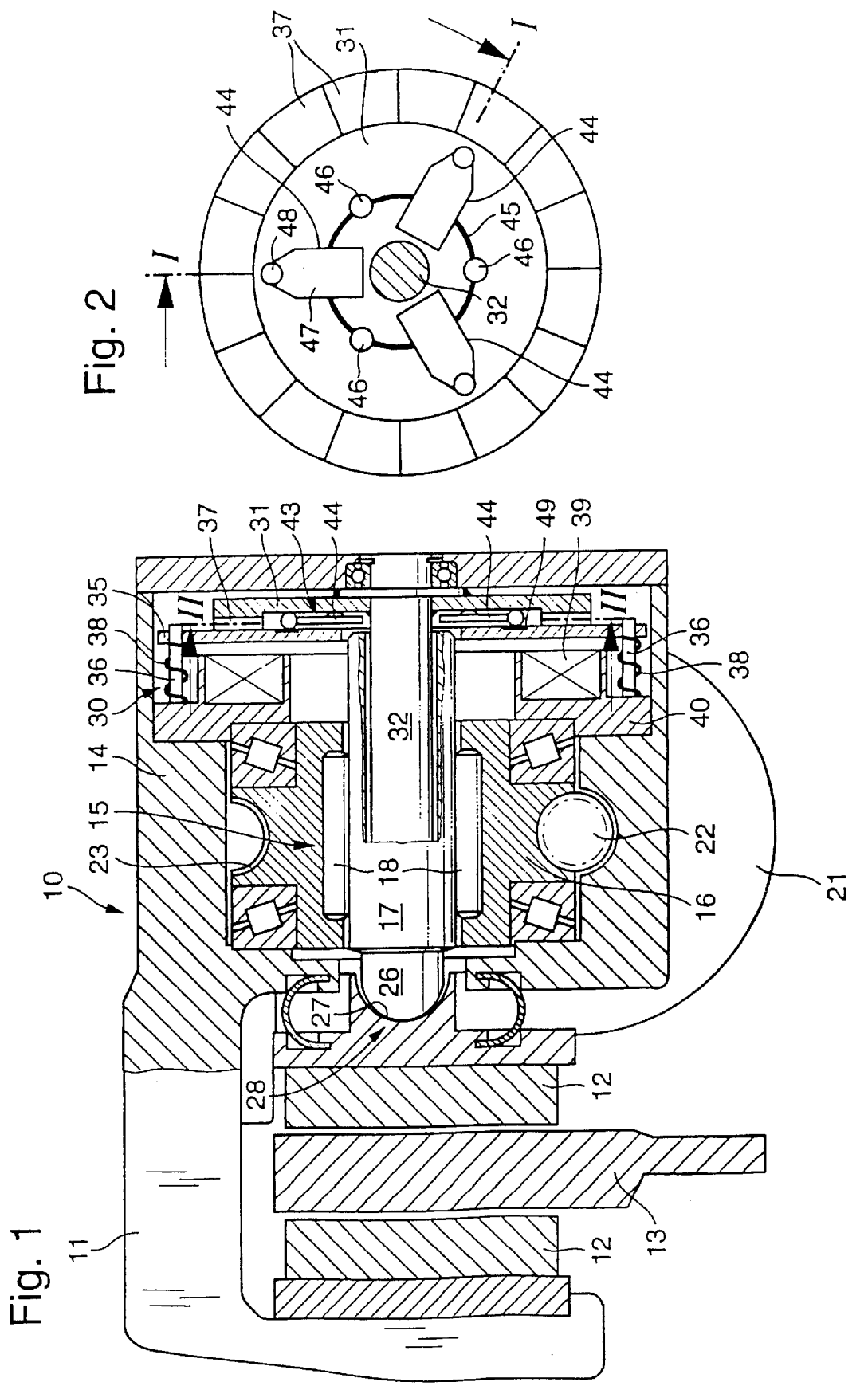

ELECTRO-MECHANICAL BRAKE SYSTEM FOR A VEHICLE

BACKGROUND OF THE INVENTION

1. Field of the Invention

The invention is directed to an improved electromechanical brake for motor vehicles.

2. Description of the Prior Art

A brake of this kind has been disclosed (WO 96/03301) in which an electric drive motor cooperates with a planetary roller screw drive whose spindle, depending on the supply of power to the motor, presses brake linings against a brake disc in an application stroke or moves these brake linings from contact with the brake disc in a restoring stroke. The position of the spindle is monitored by a sensor in order to limit the restoring stroke with a defined spindle position. Nevertheless, in the event of sensor failure, malfunctions in the control electronics of the brake, or even in the event of an incorrect electrical connection of the drive motor, when the spindle is being restored, the known brake does not prevent the permissible restoring stroke from being exceeded, does not prevent the planetary roller screw drive, for example, from becoming jammed or destroyed by the spindle striking against an obstacle, and does not prevent the motor from being overloaded.

In an electromechanical brake of this generic type known from U.S. Pat. No. 4,804,073, on the other hand, a clutch is provided, which in a first switched position in an application stroke of the brake, transmits the rotational movement of a drive motor to a screw link actuator, which is used to press brake linings against a friction element. When a permissible restoring stroke of the brake is achieved and exceeded, the clutch—in a second switched position—disengages the drive motor from the screw link actuator. A damage to the brake is thereby largely prevented. The clutch of the known brake is in fact embodied as very simple in structure, but since the function of the clutch is based on frictional engagement, its switching behavior can be subject to fluctuations, for example due to wear or due to the penetration of foreign matter.

SUMMARY OF THE INVENTION

The brake according to the invention has the advantage over the prior art that it is distinguished by a rugged clutch which is switched by the spindle in a functionally reliable, mechanical fashion. As soon as the effective disengagement of the spindle from the electric drive motor takes place, the spindle can rotate freely so that the spindle is prevented from traveling a significant distance beyond the restoring stroke.

BRIEF DESCRIPTION OF THE DRAWINGS

Other features and advantageous will be apparent from the detailed description contained herein below, taken in conjunction with the drawings in which three exemplary embodiments of the invention are shown FIG. 1 is a longitudinal section through an electromechanical brake, with a first embodiment of a clutch, the latter being depicted according to the sectional view taken along line I—I of FIG. 2, FIG. 2 is a view of the first embodiment of the clutch according to the sectional view taken along line II—II of FIG. 1, FIGS. 3 & 4 are sectional views similar to FIG. 2 and showing two other embodiments of clutches.

PREFERRED OF THE EXEMPLARY EMBODIMENTS

Figure 3:
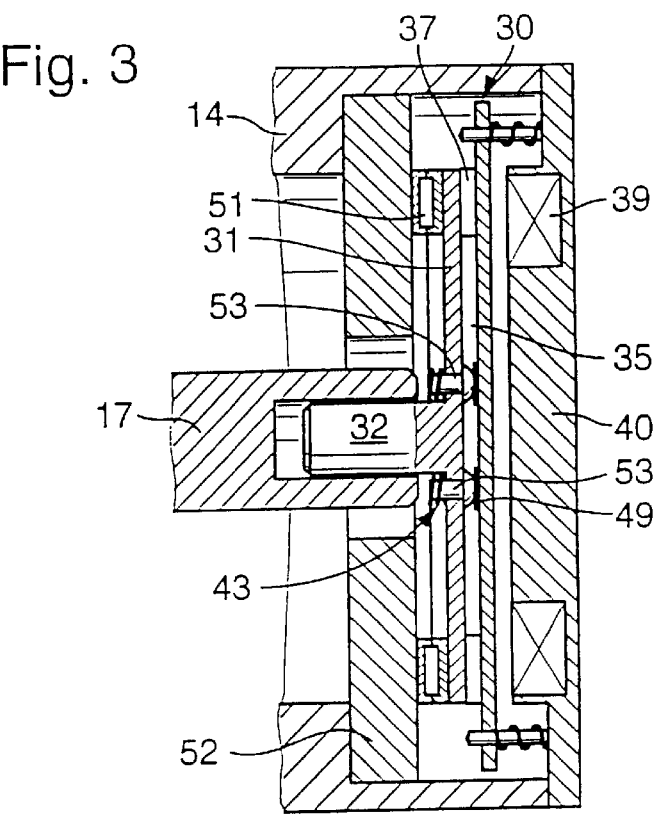

An electromechanical brake 10 shown in FIG. 1 is embodied as a disc brake. The brake has a floating caliper 11, in which a pair of frictional brake linings 12 are connected one on each side of the brake disc 13 that functions as a rotating friction element. In order to press the brake linings 12 against the brake disc 13, an antilocking screw link actuator 15 in the form of a planetary roller screw drive is disposed in a housing 14 that is combined with the floating caliper 11. This planetary roller screw drive has a spindle nut 16, which is supported so that it can rotate in the housing 14, a threaded spindle 17 that passes through this spindle nut coaxially, and a number of threaded rollers 18 disposed between the spindle nut and the threaded spindle. The threaded rollers 18 engage with a nut thread of the spindle nut 16 and with a spindle thread of the threaded spindle 17. By driving the spindle nut 16 to rotate, the threaded rollers 18 are driven into the revolving motion around the threaded spindle 17 like the planet gears of a planetary gear. During their revolving motion, the threaded rollers 18 roll in the nut thread and against the spindle thread, i.e. during the revolving motion around the threaded spindle 17, they execute a rotating motion around their own axes. The rotating motion of the threaded rollers 18 produces a translatory motion of the threaded spindle 17 in the axial direction.

For the rotating drive of the spindle nut 16, the electromechanical brake 10 has an electric drive motor 21 with a worm 22, which meshes with a continuous gearing 23 of the spindle nut 16. In the one rotating direction of electric motor 21, the threaded spindle 17 can be longitudinally moved in an application stroke in order to press the brake linings 12 against the brake disc 13 and in the other rotating direction of the motor, the spindle can be restored in a restoring stroke in order to release the brake linings 12 from the brake disc 13. The threaded spindle 17 therefore constitutes an actuation member of the electromechanical brake 10 that can be electromotively moved in two directions, longitudinally speaking.

For the low-friction engagement against the brake lining 12 on the drive end, the threaded spindle 17 is provided with a semicircular dome 26 at its one end, while the associated brake lining 12 has a hemispherical socket 27. The dome 26 constitutes a bearing head, the hemispherical socket 27 constitutes spring socket for a pivot bearing 28. This is only required in the event of a malfunction that will be described later.

Due to the antilocking feature of the screw link actuator 15, a pressure on the threaded spindle 17 in the axial direction produces its rotation, which results in a translatory motion in the axial direction. In order to secure the threaded spindle 17 against rotation during proper functioning of the electromechanical brake 10, a clutch 30 is disposed as the rotation prevention devices in the part of the housing 14 remote from the floating caliper. The clutch 30 is embodied as a positively engaging disc clutch with a first clutch disc 31 which is connected in a rotationally secured manner to a shaft end 32, which is supported so that can rotate in the housing 14. The threaded spindle 17 is guided so that it can moved axially on the shaft end 32 that runs coaxial to it. A positively engaging connection, not shown, between the shaft end 32 and the threaded spindle 17 prevents these two components from rotating in relation to each other.

The clutch 30 has a second clutch disc 35, which is guided in the housing 14 on pins 36 so that it can move axially but cannot rotate. As indicated above, the two clutch discs 31 and 35, which are provided with claws or with a complementarily embodied gearing 37 on their end faces oriented toward each other, engage with each other due to the action of press springs 38 guided on the pins 36. When the clutch 30 is engaged, the first clutch disc 31 is therefore kept from rotating. The clutch 30 can be electromagnetically disengaged. To this end, the second clutch disc 35, which serves as an armature disc, can be lifted up from the first clutch disc 31 when current is supplied to a winding 39 in a winding carrier plate 40 affixed to the housing.

When the electromechanical brake 10 is functioning properly, it is not necessary to disengage the clutch 30 since the threaded spindle 17 only needs to execute an electromotively produced longitudinal motion during the application and release of the brake. In this connection, a sensor that is not shown monitors the restoring stroke of the threaded spindle 17 in order to assure the complete release of the brake linings 12 from the brake disc 13 and to adjust an air gap therebetween. However, if the electric drive motor 21 fails during a braking maneuver, then an automatic restoring of the brake 10 is achieved through electromagnetic disengagement of the clutch 30. In fact, the threaded spindle is set into rotation because of forces acting axially on the threaded spindle 17, which are predominantly produced by the elastic deformation of the floating caliper 11 and the brake linings 12. Since the rotation of the threaded spindle 17 also results in its longitudinal movement when the spindle nut 16 is stationary (the worm drive 16, 22 is selflocking), a sufficient release of the brake 10 is produced.

The electromechanical brake 10 is also equipped with a mechanically functioning disengaging device 43 for the clutch 30. In the first embodiment of the clutch 30, the disengaging device 43 is comprised of three rocker-shaped disengaging levers 44 disposed between the two clutch discs 31 and 35. As can be seen from FIG. 2, the disengaging levers 44 are disposed extending radially and distributed evenly on the first clutch disc 31 and in fact, are connected to it by means of a retaining ring 45, which overlaps the disengaging levers 44 and is fastened to the clutch disc 31 with pins 46. With their radially inner arm 47, the disengaging levers 44 are embodied for engaging the end of the threaded spindle 17 remote from the dome 26 and with their radially outer arm 48, the disengaging levers 44 are embodied for engaging the second clutch disc 35. In the vicinity of the disengaging lever engagement, the clutch disc 35 is provided with a built-in slide ring 49 to minimize the friction between the disengaging levers 44 and the clutch disc.

Whereas in the above-described instance of a motor malfunction due to the friction in the pivot bearing 28 and in the screw link actuator 15, the permissible restoring stroke of the threaded spindle 17 is largely prevented from being exceeded, with rarely occurring malfunctions in connection with an engaged clutch 30, however, the restoring stroke can in fact be exceeded. For example, the sensor monitoring the electromotively produced restoring stroke of the threaded spindle 17 can fail or a software error in the control electronics of the electromechanical brake 10 can cause the permissible restoring stroke to be exceeded or with an unauthorized repair of the brake, a reverse polarization of the electric drive motor 21 can be produced, which results in the fact that when the brake is actuated, instead of an applying motion of the threaded spindle 17, this spindle is electromotively moved in the opposite direction. If one of these malfunctions occurs, when the permissible restoring stroke is exceeded, the threaded spindle 17, which is driven in a translatory fashion by the electric motor 21, strikes with its end remote from the dome against the inner arm 47 of the disengaging lever 44 and forces this lever into a pivoting motion, which separates the second clutch disc 35 from contact with the first clutch disc 31 counter to the force of the press springs 38. The clutch 30 is thus disengaged. Because the first clutch disc 31 is released, the threaded spindle 17 can now be set into rotation, which when the speed of the spindle nut 16 and the threaded spindle 17 are matched, leads to a rapid axial stopping of the latter. This prevents the threaded spindle 17 from traveling against the stop, prevents the screw link actuator 15 from becoming jammed or destroyed, and prevents the clutch 30 and the housing 14 from being damaged. The mechanical operability of the brake 10 is therefore maintained.

Figure 4:
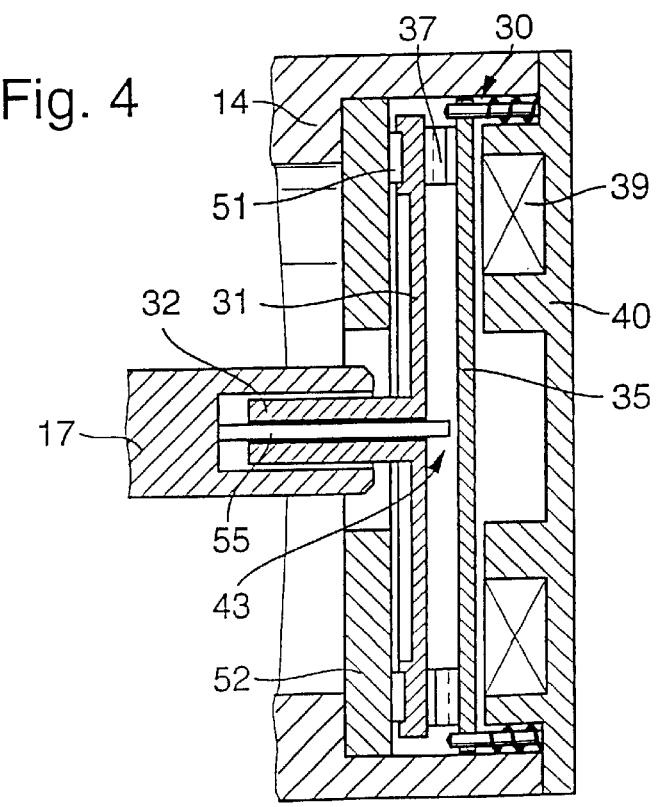

In contrast to the exemplary embodiment according to FIGS. 1 and 2, embodiments of the clutch 30 according to FIGS. 3 and 4 can be produced by switching the positions of the two clutch discs 31 and 35 because the winding carrier plate 40 constitutes the end of the housing 14 remote from the floating caliper. The first clutch disc 31 is then supported in an axially fixed manner against a bearing plate 52 by means of a roller bearing 51, which bearing plate is disposed in place of the winding carrier plate in the exemplary embodiment according to FIG. 1. As in the exemplary embodiment according to FIG. 1, the first clutch disc 31 is provided with a coaxial shaft end 32 that engages in the threaded spindle 17. Here, too, there is a positively engaging connection between the shaft end 32 and the threaded spindle 17, which prevents the two components from rotating in relation to one another, but permits an axial movement of the threaded spindle. Furthermore, close to the shaft end, the first clutch disc 31 is penetrated by a number of disengaging tappets 53 of a disengaging device 43, which are associated with a slide ring 49 on the second clutch disc 35. With a longitudinal movement of the threaded spindle 17 beyond the permissible restoring stroke, the threaded spindle engages with its end against the disengaging tappets 53 so that the tappets are moved axially and move the second clutch disc 35 from contact with the first clutch disc 31. The disengagement of the clutch 30 produced by means of this movement now permits a stroke-limiting rotation of the threaded spindle 17.

In contrast to the embodiment according to FIG. 3, in the embodiment of the clutch 30 according to FIG. 4, the shaft end 32 and the first clutch disc 31 are provided with longitudinal through bores and are provided with a disengaging tappet 55 of a disengaging device 43, which tappet passes through this bore. With a restoring stroke of the threaded spindle 17, it moves the disengaging tappet 55 against the second clutch disc 35 and thus disengages the clutch 30.

The foregoing relates to a preferred exemplary embodiments of the invention, it being understood that other variants and embodiments thereof are possible within the spirit and scope of the invention, the latter being defined by the appended claims.

What is claimed is:

1. In a electromechanical brake (10) for motor vehicles including a member (17) that can be electromotively moved axially in two directions in order to press at least one brake lining (12) against a friction element (13) in an application stroke and in order to release the brake lining (12) in a restoring stroke and a clutch (30) which can be actuated by the axially movable member (17) and which effectively disengages the axially movable member (17) from the electric drive motor (21) when a permissible restoring stroke is exceeded, the improvement wherein:

said clutch (30) comprises a positively engaging disc clutch having two cooperating clutch discs (31, 35) of which the first clutch disc (31) is supported so that it can move axially and can rotate in a housing (14) of the brake (10), whereas the second clutch disc (35) is disposed so that it is rotationally secured and can move axially in the housing (14), said axially movable member is embodied as the spindle (17) of an antilocking screw link actuator (15) connected to the first clutch disc (31) so that it is rotationally secured, and a disengaging device (43) is provided which, when engaged by the spindle (17), disengages the second clutch disc (35) from the first clutch disc (31) counter to a spring force.

2. The brake according to claim 1 wherein the clutch (30) is disposed at the end of the spindle (17) remote from the brake lining, and wherein, when the first clutch disc (31) is disposed remote from the brake lining and the second clutch disc (35) is disposed in the vicinity of the brake lining, at least one rocker-shaped disengaging lever (44) is supported against the first clutch disc (31), said disengaging lever including one arm (47) embodied for engaging the spindle (17) and another arm (48) embodied for engaging the second clutch disc (35).

3. The brake according to claim 1 wherein the clutch (30) is disposed at the end of the spindle (17) remote from the brake lining, and wherein, when the first clutch disc (31) is disposed in the vicinity of the brake lining and the second clutch disc (35) is disposed remote from the brake lining, at least one disengaging tappet (43, 55) is provided which passes through the first clutch disc (31), said at least one tappet having a first end embodied for engaging the spindle (17) and a second end embodied for engaging the second clutch disc (35).

4. The brake according to claim 3 wherein the disengaging tappet (55) is supported so that it can move longitudinally in a shaft end (32) of the first clutch disc (31) and this shaft end is engaged by the spindle (17) in a rotationally fixed and axially moveable manner.

* * * * *

UNITED STATES PATENT AND TRADEMARK OFFICE
CERTIFICATE OF CORRECTION

PATENT NO. : 6,279,690 B1
DATED : August 28, 2001
INVENTOR(S) : Wolfram Schaffer It is certified that error appears in the above-identified patent and that said Letters Patent is hereby corrected as shown below:

<u>Title page,</u>
Item [54], should read as follows:

[54] ELECTROMECHANICAL BRAKE FOR MOTOR VEHICLES

Signed and Sealed this

Sixteenth Day of April, 2002

*Attest:*

*Attesting Officer*

JAMES E. ROGAN
*Director of the United States Patent and Trademark Office*